United States Patent
Nakamoto

[11] Patent Number: 6,031,328
[45] Date of Patent: Feb. 29, 2000

[54] FLAT PANEL DISPLAY DEVICE

[75] Inventor: Masayuki Nakamoto, Chigasaki, Japan

[73] Assignee: Kabushiki Kaisha Toshiba, Kawasaki, Japan

[21] Appl. No.: 08/933,136

[22] Filed: Sep. 18, 1997

[30] Foreign Application Priority Data

Sep. 18, 1996  [JP]  Japan ................................. 8-246441

[51] Int. Cl.$^7$ .............................. H01J 29/00; G09G 3/20
[52] U.S. Cl. ........................... 313/495; 345/55; 345/75; 345/87; 359/308; 359/614
[58] Field of Search .................................. 313/495, 496, 313/112, 309, 336, 351, 441; 359/308, 343, 609, 614, 891, 298; 345/55, 75, 38, 87; 315/169.4, 349

[56] References Cited

U.S. PATENT DOCUMENTS

| | | | |
|---|---|---|---|
| 5,483,118 | 1/1996 | Nakamoto et al. | 313/309 |
| 5,727,976 | 3/1998 | Nakamoto et al. | 445/24 |
| 5,786,656 | 7/1998 | Hasegawa et al. | 313/309 X |
| 5,789,856 | 8/1998 | Itoh et al. | 313/112 X |

OTHER PUBLICATIONS

P. Vaudaine, et al. "Microtips" Flourescent Display, IEDM Technical Digest, (1991), pp. 197–200.

*Primary Examiner*—Ashok Patel
*Attorney, Agent, or Firm*—Oblon, Spivak, McClelland, Maier & Neustadt, P.C.

[57] ABSTRACT

Cathode electrodes in a plurality of rows are arranged parallel with one another on a glass substrate. Very small cold cathodes of conical shape are arranged in matrix on the cathode electrodes. An insulating layer (ITO film) having cylindrical slots surrounding cold cathodes is formed above the glass substrate and the cathode electrodes. Gate electrodes in a plurality of columns are formed on the insulating layer in the direction perpendicular to the extension of the cathode electrodes. An intersection between a cathode electrode and a gate electrode corresponds to a pixel. A glass plate is provided above the gate electrodes. An anode electrode is provided entirely on the surface of the glass plate facing the cold cathodes. A phosphor member for each pixel is formed on the surface of the anode electrode facing the cold cathodes. Thus, the light source for emitting light for each pixel is formed. A well-known liquid crystal display panel for controlling (modulating) an amount of transmission light for each pixel is provided above the light source.

14 Claims, 4 Drawing Sheets

FLAT PANEL DISPLAY DEVICE

BACKGROUND OF THE INVENTION

The present invention relates to a flat panel display device utilizing fluorescent light generated from an electron beam excitation phosphor material.

A liquid crystal display device is typical of the conventional flat panel display device. The device of this type has been widely used as a notebook type personal computer. The liquid crystal display device is, however, a device which displays an image not by emitting light by itself but by modulating (controlling) an amount of transmitted light. Therefore, it requires a light source on the back surface thereof, resulting in various disadvantages such as an increase in power consumption, a decrease in contrast and a decrease in peak brightness.

Figure 1:
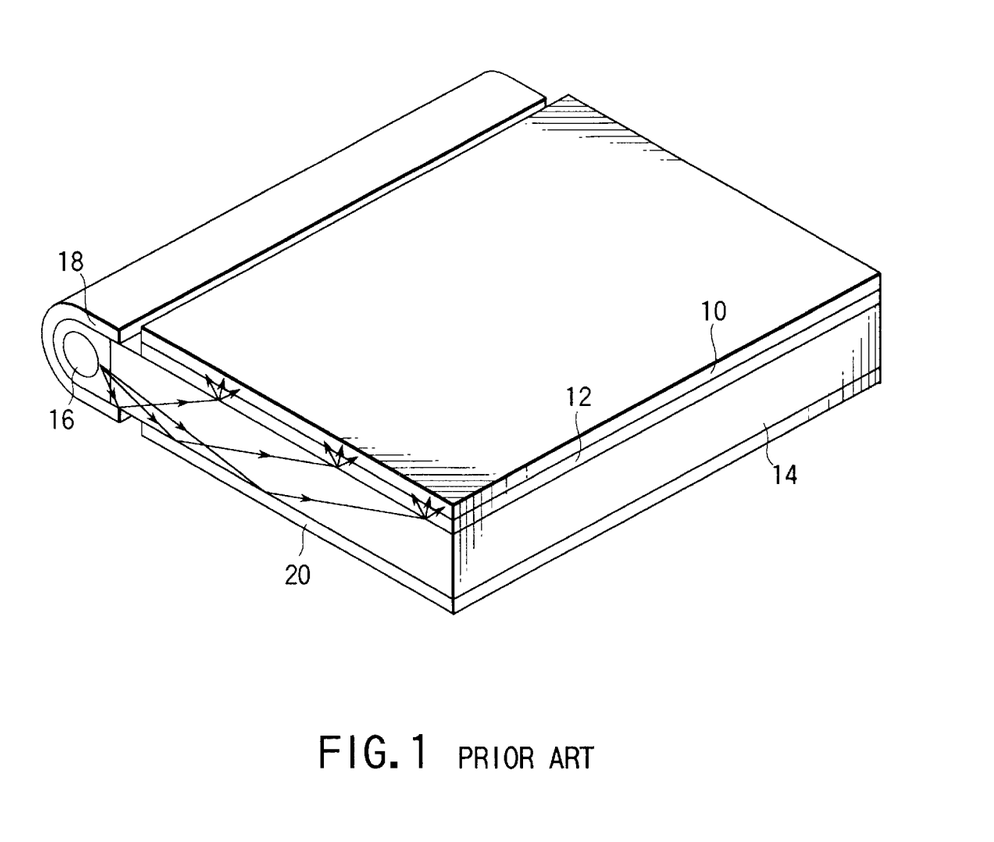
FIG. 1 shows the conventional liquid crystal display device with back light.

FIG. 1 shows an example of the conventional liquid crystal display device with back light.

A diffusion plate 12 and a light guide plate 14 are arranged below a liquid crystal display panel 10. A fluorescent lamp 16 is provided at one end portion of the light guide plate 14. Direct light from the fluorescent lamp 16 and reflected light from a reflecting plate 18 are incident on the light guide plate 14, reflected upward by a reflecting plate 20 provided below the light guide plate 14 and incident on the entire surface of the panel 10 through the diffusion plate 12 provided on the light guide plate 14. The liquid crystal display panel 10 serving as a light modulator is well known in the art so that the detailed description thereof will be omitted. The liquid crystal display panel 10 has transparent pixel electrodes and controls transmission/non-transmission of light for each pixel.

The fluorescent lamp 12 emits light based on the principal that voltage is applied to a lamp tube having inert gas tightly housed therein, plasma occurs within the tube to generate ultraviolet light and the resultant ultraviolet light is collided against the phosphor material applied onto the inner wall of the tube, thereby exciting the phosphor material to emit fluorescent light.

As described above, the fluorescent lamp as a back light of the conventional liquid crystal display device generates plasma to emit ultraviolet light which excites the phosphor material. Therefore, the conventional device has disadvantages in that light emission efficiency is very low and power consumption is large. In addition, because of the entire emission, light is incident on the entire surface of the panel so that light is incident even on pixels which are not turned on. This leads to lowering of light emission efficiency. Moreover, since light having uniform brightness is incident on the entire surface of the liquid crystal, contrast is lowered. Therefore, even if a certain point in the image is intended to be displayed brighter, the back light has uniform brightness and it is impossible to have a higher peak brightness.

To solve these disadvantages, a field emission display (FED) apparatus has been developed. "Microchips Phosphor Display", IEDM 91, pp 197–200, discloses one example of the FED device. This apparatus utilizes a field emission cold cathode electron source. Though the field emission cold cathode electron source is a kind of a triode as same as the conventional vacuum tube, it is different from the triode in that not a hot cathode but a cold cathode is used in which a high electric field is concentrated on an acute cathode (emitter) and electrons are derived based on the quantum mechanic tunnel effect. The electrons are accelerated by voltage applied between the anode and the cathode and collided against and excited by the phosphor film formed on the anode, thereby emitting light.

The field emission display (FED) apparatus is the same as the conventional CRT in that the phosphor member is excited and light is emitted therefore by the cathode rays. In principle, the FED apparatus can obtain a wide angle of visibility as wide as 180°. However, while the CRT uses a point electron source, the FED uses a plate type matrix electron source comprises an array of very small cold cathodes in microns (1 to 2 $\mu$m) for each pixel.

There are two types of the structure of the phosphor member for color display; one is an unswitched anode in which phosphor layers of three colors R, G and B are formed on an uniform ITO layer which serves as an anode and is formed on a glass substrate; the other is a switched anode in which anode electrode layers for the phosphor layers of three colors R, G and B are separately formed and the phosphor layers of R, G and B are sequentially and selectively driven. The latter has an advantage that it is not necessary to respectively form cathodes of pixels of three colors R, G and B and a positional alignment of the anode and the cathode is easy.

The miniaturization of a cold cathode itself has been developed and therefore a very small cold cathode can be provided. However, it has been difficult to manufacture a very small phosphor member (capable of showing high resolution such as photograph) for the following reasons. The constraint to the grain diameter of phosphor particles makes it difficult to separately form the phosphor members of three colors R, B and G for each fine pixel. Since a so-called black matrix wherein phosphor pixels are framed by carbon is formed in order to improve contrast, it is difficult to provide very high resolution.

BRIEF SUMMARY OF THE INVENTION

Accordingly, it is an object of the present invention to provide a flat panel display device having high precision, high brightness, high contrast and small power consumption.

According to the present invention, there is provided a flat panel display device comprising a light source having a plurality of light source elements, each of the light source elements comprising a field emission type cold cathode, an anode electrode arranged facing the cold cathode, and a phosphor member formed on a surface of the anode electrode facing the cold cathode and emitting light due to electrons emitted from the cold cathode toward the anode electrode; and a light modulator on which the light emitted from the light source is incident and which controls an amount of transmission of each light emitted from the phosphor member.

According to the flat panel display device of the present invention, light generated based on quantum mechanic tunnel effect due to collision of electrons emitted from the cold cathodes against the phosphor member is used as the light source of the image display device. Namely, light is emitted not by generating plasma but due to collision of electrons directly against the phosphor member. This makes it possible to emit light with high efficiency. In addition, since electrons are sequentially emitted from the cold cathodes corresponding to pixels to be displayed, less power is consumed. Further, the use of cold cathodes makes it possible to ensure quite large amount of electron beam current and to form a fine electron beam. As a result, desired point and region of the image can be illuminated bright, thereby enabling higher peak brightness and higher contrast.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a flat panel display device according to the present invention will now be described with reference to the accompanying drawings.

[First Embodiment]

Figure 2:
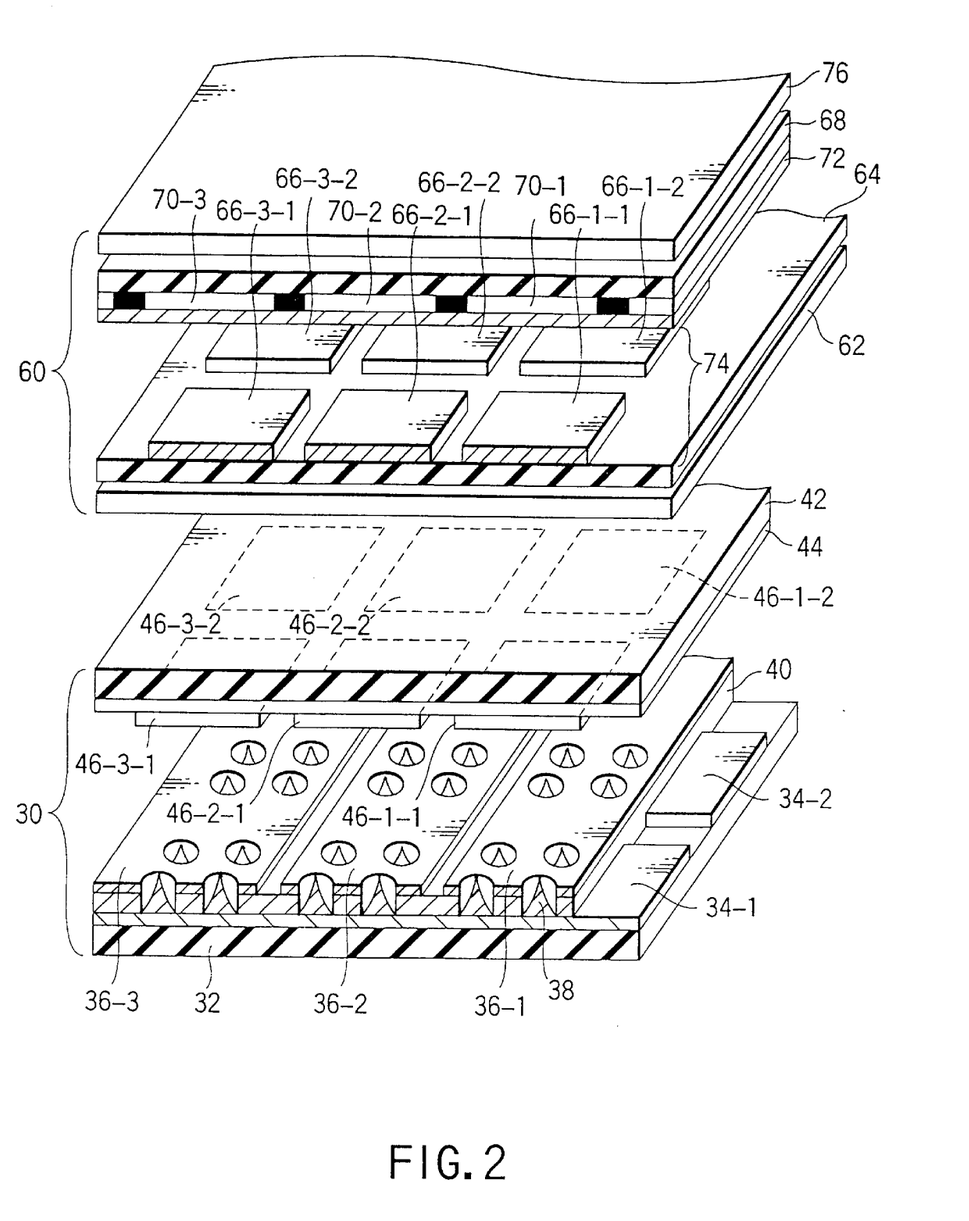
FIG. 2 is an exploded perspective view showing the structure of a liquid crystal display device as a first embodiment of the flat panel display device according to the present invention.

FIG. 2 is a perspective view showing the structure of the liquid crystal display device as the first embodiment of the flat panel display device according to the present invention. The liquid crystal display device comprises a light (back light) source unit 30 and a liquid crystal panel 60.

First, the structure of the light source unit 30 will be described. The light source unit 30 has a plurality of cathode electrodes 34-1, 34-2, . . . arranged in the row direction and parallel with one another on a glass substrate 32. One cathode electrode 34-i corresponds to a row of pixels of the display device. In this embodiment, one display pixel is made of three pixels of R, G and B for color display. If simply referring to "pixel", it will denote the former pixel hereinafter. A plurality of gate electrodes 36-1, 36-2, 36-3, . . . are arranged in parallel with one another on the cathode electrodes 34-1, 34-2, . . . through an insulating layer 40 in the column direction perpendicular to the cathode electrodes. The intersection between one cathode electrode and one gate electrode corresponds to a pixel on the display device. Many small slots, for example, cylindrical slots are formed in the gate electrodes 36-1, 36-2, 36-3, . . . located on the cathode electrodes 34-1, 34-2, . . . . Many small cold cathodes, for example, conical cold cathodes 38 are formed on the cathode electrodes 34-1, 34-2, . . . to enter the slots in the gate electrodes 36-1, 36-2, 36-3, . . . . The cold cathodes 38 serve as a light source for each pixel of the liquid crystal display panel. Therefore, in principle, it is enough to provide one cold cathode 38 for each pixel. However, considering the deterioration, destruction and unstable operation of the cold cathode, a plurality of cold cathodes 38 (note, only four cold cathodes 38 are shown in FIG. 2; however, in fact, there are usually several hundreds to several thousands cathodes) serve as a light source for one pixel to give redundancy.

A glass plate 42 is provided above the above-described structure of the light source unit 30. An anode electrode 44 made of, for example, a transparent ITO film is formed entirely on the lower side surface of the glass plate 42 facing the cold cathodes 38. Phosphor members 46-1-1, 46-1-2, . . . corresponding to pixels are provided on the lower side surface of the anode electrode 44 facing the cold cathodes 38. The phosphor members 46-1-1, 46-1-2, . . . are formed in a matrix manner at positions where the cathode electrodes 34-1, 34-2, . . . and the gate electrodes 36-1, 36-2, 36-3, . . . intersect one another.

Though not shown in FIG. 2, the cathode electrodes 34-1, 34-2, . . . , gate electrodes 36-1, 36-2, 36-3, . . . , and anode electrode 44 are connected to a light source driver circuit and applied with a driving voltage therefrom.

The phosphor members 46-i-j may be made of a mixture of phosphor substances emitting white light as a whole when electrons collide against the phosphor substances. The phosphor members 46-i-j may be made of one kind of a phosphor substance which emits white light. The phosphor members 46-i-j is made of, for example, spherical fine grain phosphor particles.

In order to provide a color image display device with a high precision, it is desirable to use a penetration phosphor substance. The penetration phosphor substance has a multi-layer structure of at least two phosphor layers having different colors. The display color is changed by changing an acceleration voltage of electron beams and changing the penetration depth of the electron beams into phosphor particles. In the same reason, it is possible to use a multi-layer phosphor substance of at least two phosphor layers having different colors or a penetration phosphor substance formed of the multi-layer phosphor layers and a non-display dielectric layer sandwiched between the multi-layer phosphor layers.

There will be described a method of manufacturing the cold cathodes 38. The present embodiment employs a transfer mold fabrication process. The transfer mold fabrication process is illustrated in FIGS. 3A to 3H.

Figure 3A:
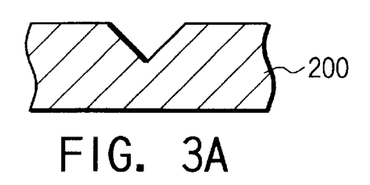
FIGS. 3A to 3H are views for explaining a transfer mold fabrication process of the field emission array.
Figure 3B:
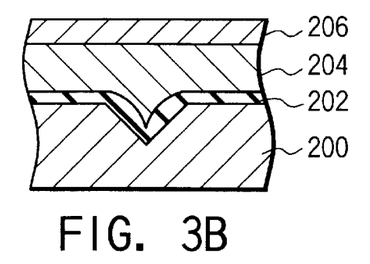
Figure 3C:
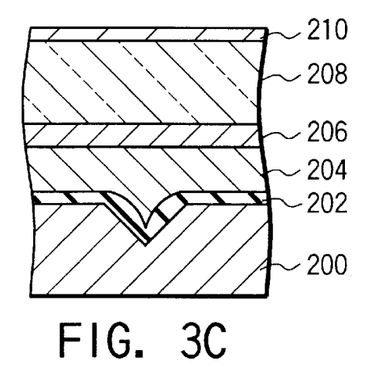

As shown in FIG. 3A, (100) Si substrate 200 is anisotropically etched through a thermally oxidized $SiO_2$ mask using 30% KOH aqueous solution to make pyramidal holes with very sharp corners, i.e., "Molds." On the contrary to the conventional fabrication method using Si anisotropical etching, the etching process is automatically stopped. Thus, it is easy to make lots of molds uniformly and reproducibly. The widths of the openings usually range from 1.0 to 3.0 $\mu$m. After removing $SiO_2$ mask, the Si molds are thermally oxidized to form emitter-to-gate high quality insulator layer with few leak. The resistivity of thermal oxidized $SiO_2$ layer is twice or three times as high as that of deposited $SiO_2$ insulators. During the thermal $SiO_2$ layer growth, the $SiO_2$ layer shapes on side walls of the molds have become convex. Subsequently, emitter material such as $LaB_6$ and TiN are deposited on the $SiO_2$ layer by sputtering to fill the molds, and emitter tips at the bottom of the molds are sharpened, as shown in FIG. 3B. Then, the emitter material layer is bonded with a glass substrate having a Al rear surface electrode by applying DC several hundred voltages, as shown in FIG. 3C.

Figure 3D:
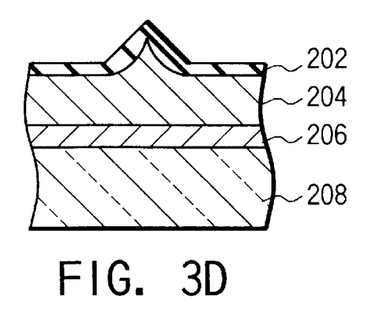

Next, an anisotropic Si etching by tetramethyl ammonium hydroxide (TMAH) solution and a $SiO_2$ etching by buffered HF solution are used to remove the Si mold substrate and the SiO$_2$ Layer, as shown in FIG. 3D. The SiO$_2$ layer acts as an etching stop layer for TMAH solution. Thus, the emitter array is transferred from the Si substrate to the glass substrate. Since emitter tips are intrinsically sharpened in the process, there is no need to sharpen them after their formation.

Figure 3E:
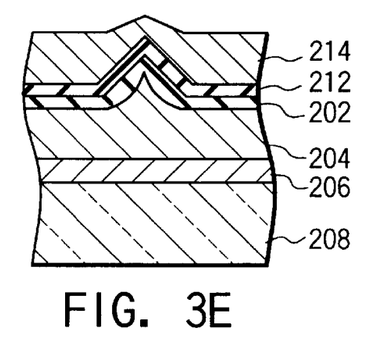
Figure 3F:
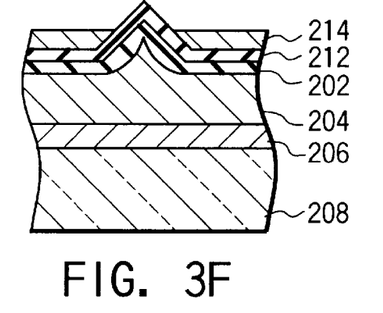
Figure 3G:
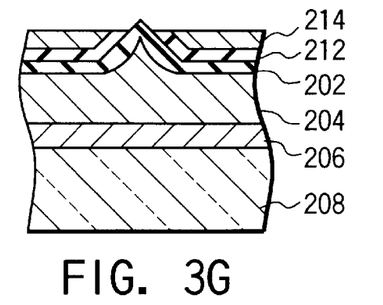
Figure 3H:
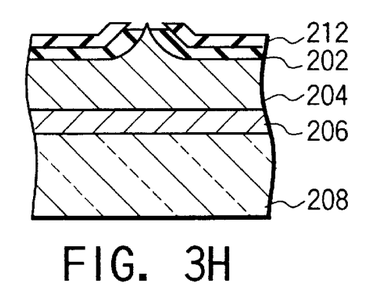

In order to make gate emitter array, following process are needed. Gate layer and resist layer are coated on the SiO$_2$ layer which is not removed in the gate fabrication process, as shown in FIG. 3E. The thin resist layer is dry etched in an oxygen plasma to reveal only the tips of the coated emitters, as shown in FIG. 3F. Finally, wet etchings of both the gate (FIG. 3G) and the oxide (FIG. 3H) result in submicron openings in the gate center on the emitters.

Next, the liquid crystal panel 60 formed on the light source unit 30 will be described. The liquid crystal panel 60 is driven by means of active matrix drive. A switching device for active matrix drive may be of thin film diode (TFD) or thin film transistor (TFT). The liquid crystal panel 60 may be driven by means of simple matrix drive.

A polarizer 62 for passing only a linearly polarization light component is provided above the light source unit 30. A glass substrate 64 is provided above the polarizer 62. Many transparent pixel electrodes 66-1-1, 66-1-2, . . . are arranged on the glass substrate 64 in a matrix fashion at positions corresponding to the phosphor members 46-1-1, 46-1-2, . . . . Though not shown in the drawing for the sake of simplicity of the description, signal wiring electrodes, switching devices for connecting the signal wiring electrodes with the pixel electrodes 66-i-j, scan electrodes for on/off controlling the switching devices, and an LCD driver circuit connected to the signal wiring electrodes and the scan electrodes for applying voltages to both the electrodes are connected to the pixel electrodes 66-i-j, as in the case of the normal liquid crystal display device of active matrix type. Specifically, the switching devices are connected to the pixel electrodes 66-i-j, respectively. A plurality of scan electrodes for on/off controlling the switching devices are provided in the row direction. A plurality of signal electrodes for applying voltage to respective pixel electrodes 66-i-j are provided in the direction perpendicular to the scan electrodes, that is, in the column direction.

A glass substrate 68 is provided above the glass substrate 64. Three color filters 70-1, 70-2 and 70-3 are cyclically provided on the lower surface of the glass substrate 68 facing the glass substrate 64. Red filters 70-1, green filters 70-2 and blue filters 70-3 are arranged corresponding to the pixels. A transparent common electrode 72 is provided on the lower surface of the color filters 70-1, 70-2 and 70-3 facing the glass substrate 64. A liquid crystal layer 74 filled with liquid crystal is formed between the glass substrate 64 and the common electrode 72. A polarizer 76 for passing only a linear polarization light component in the direction perpendicular to that of the polarizer 62 is provided above the glass substrate 68.

The intersecting portions between the cathode electrodes 34-i and the gate electrodes 36-j, the phosphor members 46-i-j and the pixel electrodes 66-i-j are arranged to overlap one another at the same positions.

The operation of this embodiment will be described. First, the emission control for each pixel will be described. The anode electrode 44 and one cathode electrode 34-i is applied with voltages. When voltage is applied to one gate electrode 36-j, electrons are emitted from the cold cathodes 38 in the intersection between the cathode electrode 34-i and the gate electrode 36-j which are applied with the voltage. The electrons collide against the phosphor members 46-i-j provided above the cold cathodes 38, thereby emitting light from the phosphor members 46-i-j. In this way, by selecting a cathode electrode 34-i and a gate electrode 36-j, the phosphor member 46-i-j is capable of emitting light for each pixel.

According to the first embodiment, light generated due to collision of electrons emitted from the cold cathodes based on the quantum mechanic tunnel effect against the phosphor members is used as the back light of the liquid crystal panel 60. Light is emitted not by generating plasma so that it is possible to emit light with high efficiency. In addition, since the back light is controlled for each pixel, light usage efficiency is high and less power is consumed. Further, use of cold cathodes makes it possible to ensure quite large amount of electron beam current and to form a fine electron beam. As a result, a desired point and region of the image can be illuminated brighter, thereby enabling high peak brightness and higher contrast.

The operation of the liquid crystal panel 60 will be described. The light emitted from the phosphor member 46-i-j is converted into linearly polarized light by the polarizer 62. The liquid crystal layer 74 is sandwiched by the common electrode 72 and the pixel electrodes 66-i-j and is turned on/off based on the voltage applied between the both electrodes. The liquid crystal layer 74 may be, for example, a twisted nematic (TN) liquid crystal and has a molecular configuration twisted by 90° in an off state. The incident light to the liquid crystal layer 74 is rotated by 90°.

In an on state in which the voltage is applied between the both electrodes 72 and 66-i-j, twist is released so that the molecular configuration is aligned along the electric field and the polarization plane of the light is not rotated. Therefore, when the liquid crystal layer 74 is in an off state, the linearly polarized light passed through the lower polarizer 62 is rotated by 90° in the liquid crystal layer 74 and thus can be passed through the upper polarizer 76. The display pixel is bright. When the liquid crystal layer 74 is in an on state, the linearly polarized light passed through the lower polarizer 62 is not rotated by 90° in the liquid crystal layer 74, therefore it cannot be passed through the upper polarizer 76 whose polarization plane is rotated from that of the lower polarizer 62 by 90°. The display pixel is dark. Therefore, if voltage is applied to the scan electrode to turn on the switching device connected to the pixel electrode 66-i-j and an image data signal is input from the signal electrode to the pixel electrode 66-i-j, the liquid crystal layer 74 arranged between the pixel electrode 66-i-j and the common electrode 72 is turned on and off in accordance with the input signal for each pixel, thereby controlling the amount of light passed through the liquid crystal layer 74 for each pixel.

The light passed through the liquid crystal layer 74 is colored one of R, G and B by the color filters 70-1, 70-2 and 70-3.

The actual display of an image will now be described. Voltage is applied to the scan electrode and to the common electrode 72 such that the switching devices of respective pixel electrodes 66-i-j of a certain row are turned on. Signal voltages in accordance with the image data are simultaneously applied to the pixel electrodes 66-i-j in the row from all the signal electrodes. The liquid crystal layer 74 between the pixel electrodes 66-i-j and the common electrode 72 is turned on and off, depending on the respective signal voltages. If the liquid crystal layer 74 is in an off state, the amount of light passed therethrough increases. If the liquid crystal layer 74 is in an on state, the amount of light passed therethrough decreases. At this time, in the light source unit 30, voltage is applied to the anode electrode 44 and also to the cathode electrodes 34-i and the gate electrodes 36-j corresponding to the pixel electrodes 66-i-j in the selected row, respectively, thereby emitting electrons from the cold cathodes 38 located at the intersected pixel portion. The light source driving circuit and the liquid crystal display driving circuit are operated in an interlocking manner.

The emitted electrons collide against the phosphor members 46-i-j, whereby white light is emitted from the phosphor members 46-i-j. The white light from the phosphor members 46-i-j is converted into linearly polarized light when transmitted through the polarizer 62 and enters the liquid crystal layer 74. The incident light is rotated in accordance with on/off states of the liquid crystal layer 74. If the liquid crystal layer 74 is in an off state, light is rotated by 90°. The rotated light is colored when transmitted through the color filters 70-1, 70-2 and 70-3 and incident on the upper polarizer 76. The upper polarizer 76 selectively passes light in accordance with the polarization direction of the incident light, i.e., modulates the amount of transmission light. Thus, while signal voltages corresponding to the image data are sequentially supplied to pixels electrodes of R, G and B in one row from the signal electrodes, display of each row is sequentially performed.

Although signal voltages are applied simultaneously to the pixel electrodes 66-i-j connected to the scan electrodes in one row, the liquid crystal layer 74 between the pixel electrodes 66-i-j and the common electrode 72 keeps the angle of rotation for a while. Therefore, even if light is emitted sequentially from the back light panel unit 30 for each pixel, image corresponding to the image data is displayed on the liquid crystal panel 60.

As can be seen from the above description, according to the liquid crystal display device of this embodiment, not a fluorescent lamp as conventionally used but a field emission array wherein electrons collide directly against the phosphor member to thereby emit light, is used as a light source for back light. As a result, it is not necessary to generate plasma for emitting ultraviolet light so that high light emission efficiency is ensured and less power is consumed. In addition, unlike the conventional entire emission in the case of the fluorescent lamp, light is emitted for each pixel to be displayed, thus further decreasing the power consumption and improving the contrast.

Further, since the cold cathode can flow a large current, it is possible to make the peak brightness higher and the contrast more higher. The thickness of the flat panel display device of the present invention is far thinner than that of the fluorescent lamp.

It is possible to modify this embodiment as follows. In the above description, the light emission is controlled for each pixel. However, voltage may be applied to all of the gate electrodes 36-1, 36-2, 36-3, . . . and electrons may be derived from all of the cold cathodes formed on one cathode electrode 34-i to display an image of each row. In this case, a gate electrode, instead of gate electrodes 36-1, 36-2, 36-3, . . . in a plurality of columns shown in FIG. 2, can be formed on the entire surface of the insulating layer 40.

A phosphor member 46-i-j is formed for each pixel electrode in this embodiment. However, it is possible to form a phosphor member on the entire surface of the anode electrode 44. Furthermore, if color image can be displayed by means of the color filters, light of colors other than white is applicable. For example, lights of R, B and G similar to the color filters can be emitted from the phosphor member 46-i-j. In the case of a monochrome display device, it is possible to use a phosphor member for emitting light of a single color, such as green and orange. Provided color display can be enabled, it is possible to use color filters other than red, green and blue filters. Further, the color filters are not necessary if the phosphor member can emit lights of R, B and G.

Moreover, the present embodiment can be applied to a projection type display device, not a conventional direct display type device. A halogen lamp or the like is used as a light source in an LCD projector. It is possible to use the light source unit 30 of the present invention instead of the halogen lamp. If the light source unit 30 of the present invention is used in the projector, the amount of power consumption is decreased, a cooling fan becomes unnecessary, the device advantageously becomes thinner as a whole, and a design for an optical system becomes easier because of the point light source with high luminance. As a result, the display image is free from distortion.

The liquid crystal panel is used as a light modulator in this embodiment. However, means other than the liquid crystal panel can be used provided it has a plurality of pixels arranged in matrix for respectively controlling an amount of back light transmitted. For example, a light modulator using PLZT (Lead Lanthanum Zirconate Titanate) is applicable.

The phosphor members 46-i-j may emit not white light but light of colors corresponding to pixels (such as red, green and blue). In this case, color light with lower color purity is possible.

[Second Embodiment]

Figure 4:
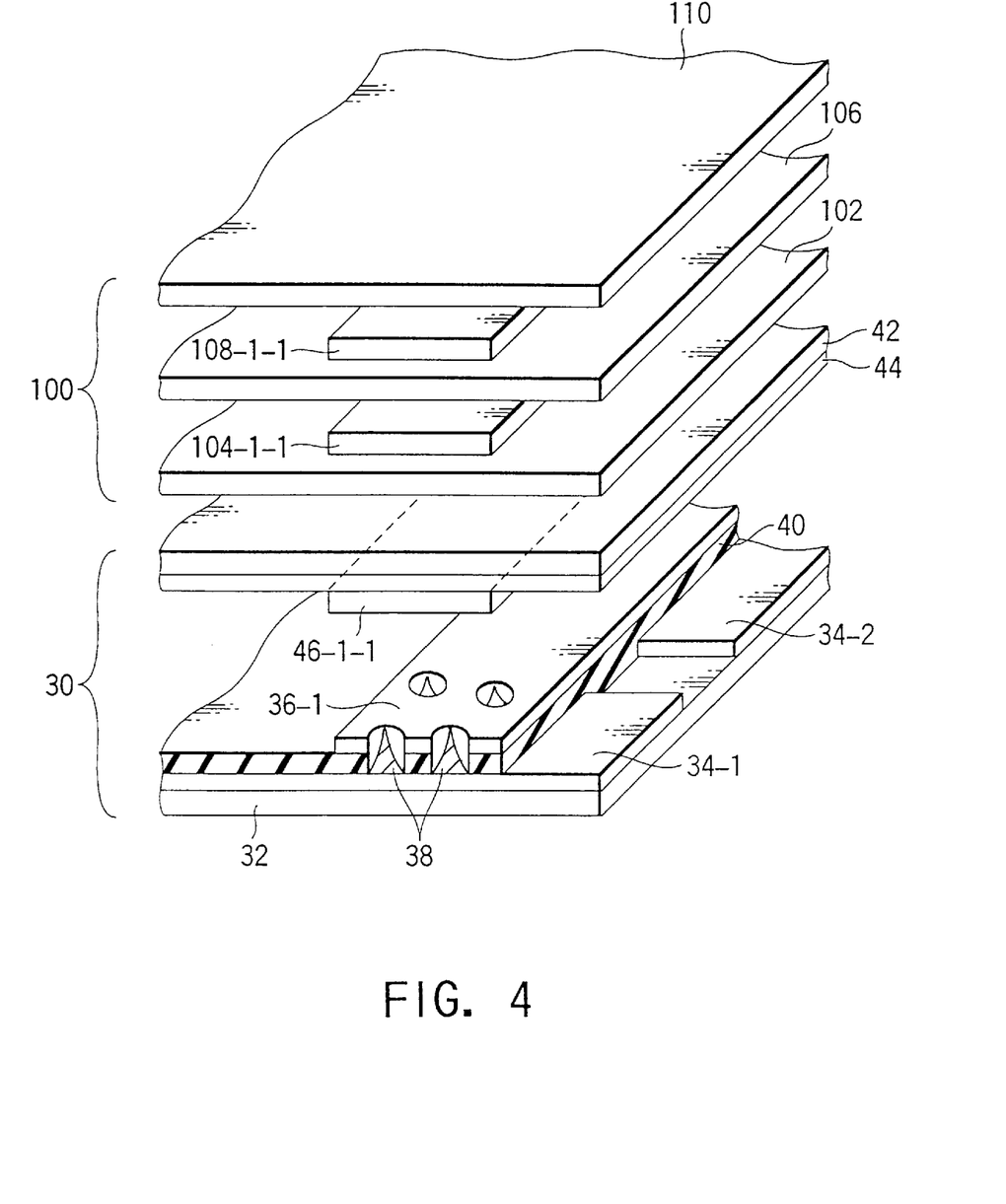
FIG. 4 is an exploded perspective view showing the structure of a field emission array type display device as the second embodiment of the flat panel display device according to the present invention.

FIG. 4 is a perspective view showing the structure of the field emission array type display device in the second embodiment according to the present invention.

The second embodiment differs from the first embodiment in that a color liquid crystal shutter 100 instead of the liquid crystal panel 60 is provided above the light source unit 30 of the first embodiment. The color liquid crystal shutter 100 comprises a first polarizing filter 102, a first liquid crystal panel 104 for each pixel, a second polarizing filter 106, a second liquid crystal panel 108 for each pixel and a third polarizing filter 110. The first polarizing filter 102 is a neutral polarizing plate and transmits R, G and B components having a polarization plane in the horizontal direction. The second and third polarizing filters 106 and 110 are color polarization plates. The second polarizing filter 106 transmits B component having a polarization plane in the horizontal direction and R and G components having a polarization plane in the vertical direction. The third polarizing filter 110 transmits R component having a polarization plane in the horizontal direction and B and G components having a polarization plane in the vertical direction. The first and second liquid crystal panels 104 and 108 has the same structure as the liquid crystal panel 60 in the first embodiment except that the color filters 70-1, 70-2 and 70-3 and the polarizers 62 and 76 are not provided. While in an on state (i.e. voltage is applied), the panels 104 and 108 do not rotate the polarization plane of the incident light. While in an off state (i.e. voltage is not applied), they rotate the polarization plane by 90°.

Specifically, in the second embodiment, by selectively turning on/off the first and second liquid crystal panels 104 and 108 for each pixel, white light from the light source unit 30 is colored one of R, G and B to thereby display color images. The case in which the first and second liquid crystal panels 104 and 108 are on and off states will be described. Those components having the polarization plane in the horizontal direction among the white light emitted from the light source unit 30 are only passed through the first polarizing filter 102. Since the first liquid crystal panel 104 is an on state, the components are passed through the first panel 104 with the polarization plane being unchanged and are incident on the second polarizing filter 106. Since the second polarizing filter 106 transmits only B color component among color components having the polarization plane in the horizontal direction, only B color component is passed through the filter 106 and incident on the second liquid crystal panel 108. Here, the second liquid crystal panel 108 is in an off state. Therefore, the polarization plane of B color component is rotated by 90° to thereby provide B color component with the polarization plane in the vertical direction and B color component is incident on the third polarizing filter 110. Since the third polarizing filter 110 transmits B color component having the polarization plane in the vertical direction, B color component is passed through the third polarizing filter 110.

Likewise, if the first and second liquid crystal panels 104 and 108 are on and off states, G color component is passed through the third polarizing filter 110. If the first and second liquid crystal panels 104 and 108 are both off state, R is passed through the third polarizing filter 110.

As can be understood from the above-description, according to the second embodiment of the present invention, there is no need to color the phosphor member R, G and B, separately since the single color with high color purity can be obtained in high precision by changing the voltage applied to the color liquid crystal shutter in accordance with the image data. There is also no need to form a black matrix since the single color can be obtained with high contrast. Therefore, resolution can be determined only by the field emission array and the liquid crystal panels, and a flat panel display device with ultra high precision can be thereby provided. Such characteristics as low power consumption, high brightness and high contrast resulting from the light source unit 30 can be attained in the second embodiment, as well.

As in the case of the first embodiment, the second embodiment can be modified.

As described above, according to the image display device of the present invention, light generated based on quantum mechanic tunnel effect due to collision of electrons emitted from the cold cathodes against the phosphor member is used as the light source of the image display device. Namely, light is emitted not by generating plasma but due to collision of electrons directly against the phosphor member. This makes it possible to emit light with high efficiency. In addition, since electrons are sequentially emitted from the cold cathodes corresponding to pixels to be displayed, less power is consumed.

Further, the use of cold cathodes makes it possible to ensure quite large amount of electron beam current and to form a fine electron beam. As a result, desired point and region of the image can be illuminated bright, thereby enabling higher peak brightness and higher contrast.

Since it is not necessary to color the phosphor member in R, G and B as well as the size of the cold cathode is a micron order, the display device with very high precision can be provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A flat panel display device comprising:

a light source having a plurality of light source elements, each of the light source elements comprising: a field emission type cold cathode; an anode electrode arranged facing said cold cathode; and a phosphor member formed on a surface of said anode electrode facing said cold cathode and emitting light due to electrons emitted from said cold cathode toward the anode electrode; and a light modulator on which the light emitted from said light source is incident and which controls an amount of transmission of each light emitted from said phosphor member based on an image signal.

2. The display device according to claim 1, in which said phosphor member emits white light or light with one of three primary colors of display;

said light modulator comprises:
  a first polarizer on which the light emitted from said light source is incident and which has a first linear polarization plane;
  a light modulation layer on which the light emitted from said first polarizer is incident and which rotates a polarization plane of incident light by a predetermined angle in accordance with display data;
  a color filter on which the light emitted from said light modulation layer is incident and which colors incident light one of three primary colors of display; and
  a second polarizer on which the light emitted from said color filter is incident and which has a second linear polarization plane, said second linear polarization plane deviating from said first linear polarization plane by the predetermined angle.

3. The display device according to claim 1, in which said phosphor member emits light with one of three primary colors of display;

said light modulator comprises:
  a first polarizer on which the light emitted from said light source is incident and which has a first linear polarization plane;
  a light modulation layer on which the light emitted from said first polarizer is incident and which rotates a polarization plane of incident light in accordance with display data by a predetermined angle; and
  a second polarizer on which the light emitted from said light modulation layer is incident and which has a second linear polarization plane, the second linear polarization plane deviating from said first linear polarization plane by the predetermined angle.

4. The display device according to claim 1, in which said phosphor member emits white light;

said light modulator comprises:
  a first polarizing filter on which the light emitted from said light source is incident and which has one of a first linear polarization plane and a second linear polarization plane for all color components, the first linear polarization plane deviating from the second linear polarization plane by a predetermined angle;
  a first light modulation layer on which the light emitted from said first polarizing filter is incident and which rotates a polarization plane of incident light by a predetermined angle in accordance with display data;

a second polarizing filter on which the light emitted from said first polarizing filter is incident and which has said first linear polarization plane for some color components and said second linear polarization plane for some other color components;

a second light modulation layer on which the light emitted from said second polarizing filter is incident and which rotates a polarization plane of incident light by a predetermined angle in accordance with display data; and a third polarizing filter on which the light emitted from said second polarizing filter is incident and which has said first linear polarization plane for some color components and said second linear polarization plane for some other color components.

5. The display device according to claim 2, 3, or 4, in which said predetermined angle is 90°.

6. The display device according to claim 4, in which said second polarizing filter has a horizontal polarization plane for a blue component and a vertical polarization plane for red and green components; and said third polarizing filter has the horizontal polarization plane for a red component and the vertical polarization plane for blue and green components.

7. The display device according to claim 2, 3 or 4, in which said light modulation layer is a liquid crystal layer.

8. The display device according to claim 2, 3 or 4, in which said light modulation layer is a Lead Lanthanum Zirconate Titanate layer.

9. The display device according to claim 2, 3 or 4, in which said light modulation layer is driven by means of active matrix drive using a switching device including a thin film transistor or a thin film diode.

10. The display device according to claim 2, 3 or 4, in which said light modulation layer is driven by means of simple active matrix drive.

11. The display device according to claim 1, 2, 3 or 4, in which each of said light source elements comprises plural field emission cold cathodes.

12. The display device according to claim 1, 2, 3 or 4, which further comprises means for driving said light source and said light modulator in an interlocking manner.

13. The display device according to claim 12, in which said driving means comprises means for driving said light source and said light modulator for each of said light source elements.

14. The display device according to claim 12, in which said driving means comprises means for driving said light source and said light modulator for one row of said light source elements.

* * * * *